UNITED STATES PATENT OFFICE.

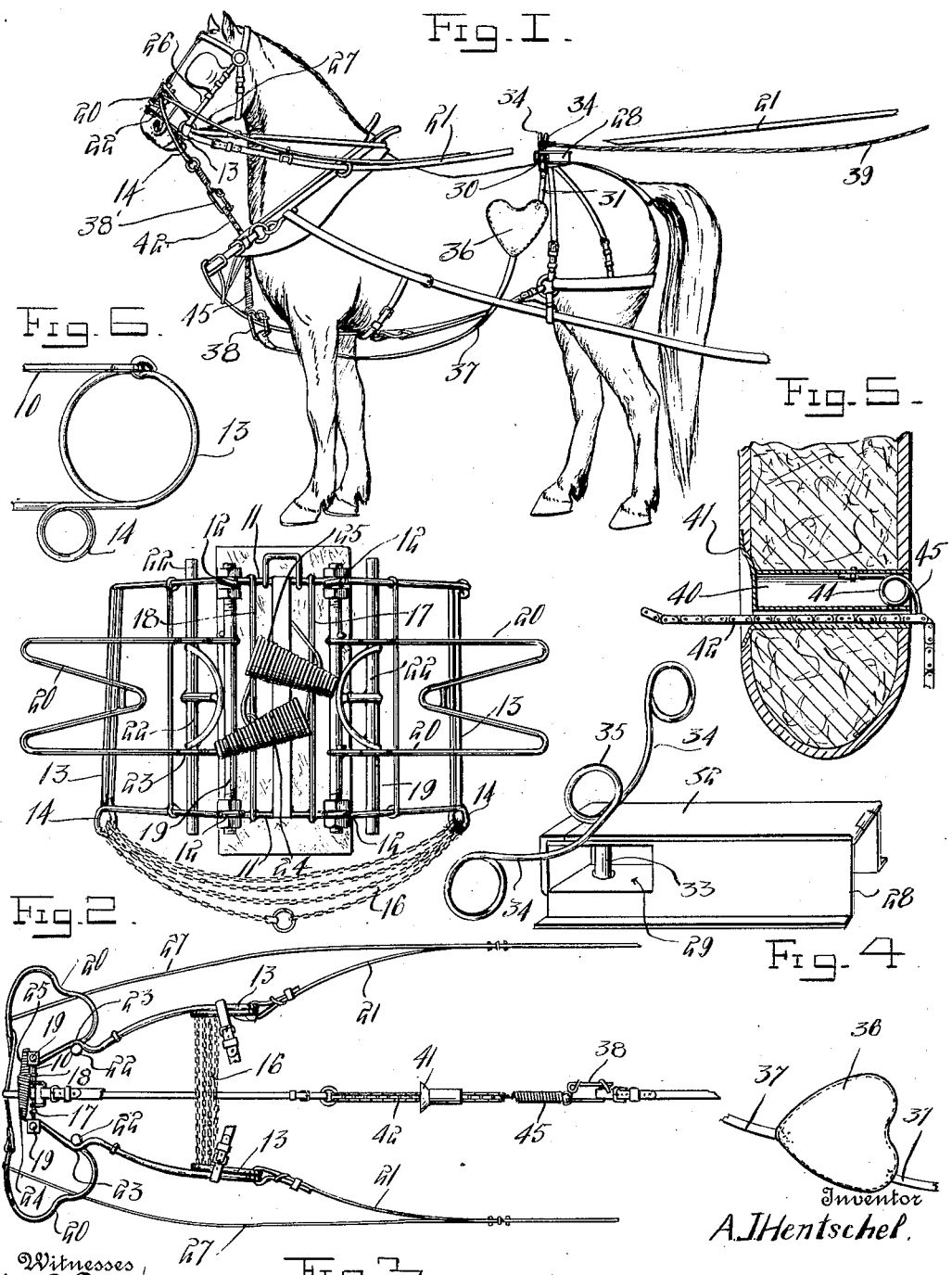

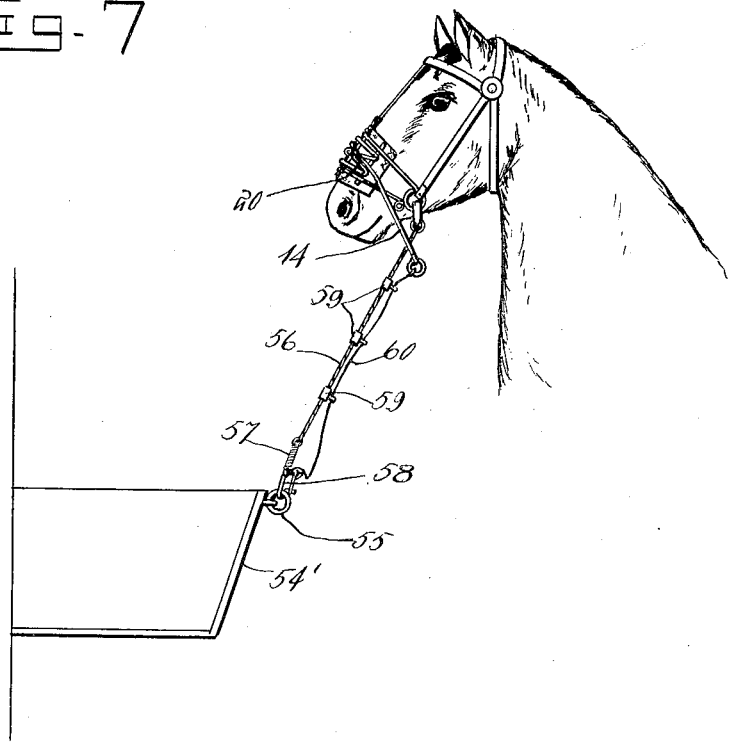

ANDREW J. HENTSCHEL, OF SCHULENBURG, TEXAS.

BRIDLE AND BIT.

1,092,214. Specification of Letters Patent. Patented Apr. 7, 1914.

Application filed March 7, 1913. Serial No. 752,780.

*To all whom it may concern:*

Be it known that I, ANDREW J. HENTSCHEL, a citizen of the United States, residing at Schulenburg, in the county of Fayette, State of Texas, have invented certain new and useful Improvements in Bridles and Bits; and I do hereby declare the following to be a full, clear, and exact description of the invention, such as will enable others skilled in the art to which it appertains to make and use the same.

This invention relates to improvements in animal detainers.

The principal object of the invention is to provide a simple device of this character of the type known as stranglers by means of which a horse or other animal may be easily controlled by exerting pressure on the animal's nose.

Another object is to provide a device of the character above-mentioned, in which the strangler features become operative upon slight pull on the auxiliary reins.

Another object is to provide a device of this character wherein the animal steps on a device released by the driver which actuates the strangler.

Other objects and advantages will be apparent from the following description and with particular reference to the accompanying drawings.

In the drawings: Figure 1 is a side elevation showing my invention applied to a horse. Fig. 2 is a front elevation of the bridle and bit, slightly enlarged. Fig. 3 is an enlarged plan view of the harness removed from the animal. Fig. 4 is a detail view of the crupper strap block. Fig. 5 is an enlarged vertical section through the lower portion of the harness. Fig. 6 is an enlarged detail of the rein holder. Fig. 7 is an elevation of the strangler as used with a halter.

Referring particularly to the accompanying drawings, 10 represents a frame formed of wire having the upper and lower transverse members 11, the ends of which are given single coil turns 12, and extended rearwardly where they are connected together in the form of a loop 13, a smaller loop 14 being formed directly below the larger loop. Secured to the smaller loop 14 is a flexible bit 16, this bit being formed preferably of chain links. Secured to the loops 13 are the driving reins 21. Longitudinal bars 17 and 18 are secured at their ends to the transverse portions of the front of the frame and form braces for the frame, to hold the upper and lower transverse members properly spaced apart. Rotatably mounted in the coil turns of the frame are shafts 19, one being placed on each side. Secured to each of the shafts and extending rearwardly and then curved forwardly is an arm 20. Secured to each of the curved arms is a vertical nostril engaging bar 22, this bar being arranged inside of the rearwardly extending portion of the frame 10 and bearing in the outwardly bowed portions of the rearward extensions of the frame, as indicated at 23. Secured at one of its ends to one of the vertical bars 17 of the frame 10 is a strong coil spring 24, the opposite end of which is secured to one of the curved arms 20. Secured at its opposite ends respectively to the other of the bars 17 and the other curved arm 20 is a second coiled spring 25. These springs hold the curved arms 20 normally forward so that the nostril engaging bars rest on the recessed or bowed portions of the frame 10. The frame 10 and the attached parts are attached to the horse's head by the bridle 26, the forward portion of the frame being disposed over the horse's nose.

Secured at their forward ends to the outer ends of the curved arms 20 are the auxiliary reins 27, the rear ends of which are secured near the rear ends of the driving reins.

Mounted on the crupper strap is a block 28, a transverse opening 29 being formed therethrough to receive a loop 30 on one end of a strap 31. Pivotally mounted at one end of the block is a plate 32, the free end of which carries a downwardly extending lug 33 for engagement through a vertical opening in the end of the block. This vertical opening opens into the transverse opening, the said pin adapted to engage within the said loop 30. Mounted on the upper side of the free end of the pivoted plate 32 are the upwardly and outwardly extending wings 34, the purpose of which will appear later, a loop or eye 35 being formed between the said wings. A spring (not shown) normally holds a plate 32 in depressed position. The other end of the strap 31 is attached to a leather plate 36, and to the other end of this plate is attached one end of a strap 37. The opposite end of this strap extends up between the horse's front legs and is secured to a safety hook member 38, to which later reference will be made. A line 39 passes through the middle ring of the pivoted plate 32, and is secured to the dash-board of the vehicle within convenient reach of the driver. This line is for the purpose of raising the plate 32 in the event that the driving reins 21 are jerked from the driver's hands.

When the horse becomes unruly, and will not respond to the pulling of the auxiliary reins, the driving reins are then engaged under the outwardly extending wings 34 carried by the pivoted plate, and the plate lifted to release the strap 31 to permit the leather plate 36 to fall to the ground. This plate falls in front of the horse's hind feet in such position that the horse will step on it. When the horse steps on the plate, the strap 37 will be pulled with only a slight jerk, but with sufficient force to bring the nostril engaging bars against the animal's nose, and hold them in such position by means now to be described.

In the lower portion of the collar of the harness is formed an opening, in which is inserted a double channeled member 40, which member is provided with a flange 41 by means of which the same is bolted or otherwise secured by the collar. Extending through the lower channel is a chain 42, the links of which are adapted to engage the free end 43 of a strong coil spring 44 mounted in one end of the said channel, one end of the chain being secured to one end of a coil spring 45 by a hook member 38', while the other end is attached to the detachable hook 38 before mentioned. The spring 45 is connected at its other end to the loop 14.

The free end of the coil spring is so arranged that when the animal steps on the plate 36, the strap is pulled and the chain permitted to be drawn through the channel until stopped by the upper hook member 38', but as the links of the chain pass under the free end of the spring, the same is prevented moving backward. This pulls down the horse's head as well as the arms 20 and holds the same in that position until released by the driver who unhooks the member 38'. When the animal's head is pulled down in this position, he is not in any condition to run, as a runaway horse or any runaway animal holds its head up in the air.

It will of course be understood that the channel member in the collar and the locking member on the crupper strap together with the leather plate 36 may be dispensed with, and only the main and auxiliary reins used to operate the nostril engaging member.

Referring particularly to Fig. 7, I have shown the application of the strangler to a halter. In this figure, 54' represents a manger, or feed trough, which carries the usual strap ring 55. The strangler, as shown in Fig. 1 is attached to the bridle of the halter with the following modifications: The chain bit is placed below the animal's lower jaw. To this is attached the halter strap 56, the opposite end of said strap being connected to a spring 57, which carries a safety hook 58 for attachment to the ring 55. Secured to the strap 56, at various points along its length, are guide members 59, through which a strap 60 passes. This strap 60 is secured at its lower end to the hook 58 and at its opposite end to the loop strap 14 which is attached to the pivoted member 20'. The strap 60 is of slightly greater length than the strap 56, so that when the horse throws up his head, said strap 60 will become taut and pull on the members 20', due to the stretching of the spring 57.

What is claimed is:

1. A strangler bridle comprising a plate for engagement over the animal's nose, extensions on the plate, said extensions being adapted for attachment of the driving reins, shafts rotatably mounted on the plate, arms secured to the shafts and extending laterally from the plate, chains secured at their opposite ends to the extensions, and bars on the arms for engagement against the nostrils of the animal.

2. In a horse checking device, the combination with a bridle and crupper strap of a harness, of a strangler device mounted on the bridle over the horse's nostrils, a chain connected to the strangler, a strap resiliently connected to the chain, said chain passing through the collar of the harness, a detent carried by the collar and engaging the chain to limit the upward movement thereof, a plate attached to the end of the strap, releasable means carried by the crupper strap for supporting the plate, and means for releasing the said plate to permit the same to fall to the ground for the horse to step on.

3. In a horse checking device, a strangler carried by the bridle, and releasable holding means carried by the crupper strap of the harness, means connected to the strangler at one end and supported at the other end by the holding device for engagement by the driving reins to release the said means for the animal to step upon to actuate the strangler, connections between the strangler and the means for the animal to step upon, means carried by the collar of the harness to prevent release of the strangler, and means carried by the said connections arranged to engage the collar and limit the downward pull of the animal's head.

4. A controlling device for a horse comprising a strangling device carried by the bridle, a driving rein resiliently connected to the strangling device, and a slack rein connected to the bridle, whereby a pull on the resiliently connected rein will draw the second line taut and actuate the strangling device.

5. In a horse checking device, a strangler carried by the bridle, and releasable holding means carried by the crupper strap of the harness, means connected to the strangler at one end and supported at the other end by the holding device for engagement by the driving reins to release the said means for the animal to step upon to actuate the strangler, and means carried by the collar of the harness to prevent release of the strangler.

In testimony whereof, I affix my signature, in the presence of two witnesses.

ANDREW J. HENTSCHEL.

Witnesses:
FRANK A. BEZECNY,
RUDOLF P. PURTKA.

---

Copies of this patent may be obtained for five cents each, by addressing the "Commissioner of Patents, Washington, D. C."